United States Patent
Ichiyoshi (10) Patent No.: US 7,283,491 B2
(45) Date of Patent: Oct. 16, 2007

(54) COMMUNICATION SYSTEM AND METHOD CAPABLE OF BROADCASTING BY USING TERRESTRIAL AND SATELLITE COMMUNICATION NETWORKS

(75) Inventor: Osamu Ichiyoshi, Tokyo (JP)

(73) Assignee: NEC Corporation, Tokyo (JP)

( * ) Notice: Subject to any disclaimer, the term of this patent is extended or adjusted under 35 U.S.C. 154(b) by 1090 days.

(21) Appl. No.: 10/281,256

(22) Filed: Oct. 28, 2002

(65) Prior Publication Data

US 2003/0081587 A1    May 1, 2003

(30) Foreign Application Priority Data

Oct. 29, 2001   (JP)  ............................. 2001/330984

(51) Int. Cl.
*H04B 7/212*   (2006.01)

(52) U.S. Cl. .................................... 370/321; 370/486
(58) Field of Classification Search ................ 370/321, 370/486, 487
See application file for complete search history.

(56) References Cited

U.S. PATENT DOCUMENTS

| | | | |
|---|---|---|---|
| 6,188,684 B1* | 2/2001 | Setoyama et al. ........... | 370/352 |
| 2002/0059649 A1* | 5/2002 | Ichioka ....................... | 725/153 |
| 2002/0095510 A1* | 7/2002 | Sie et al. .................... | 709/231 |
| 2002/0131428 A1* | 9/2002 | Pecus et al. ................ | 370/401 |
| 2002/0147992 A1* | 10/2002 | King et al. .................. | 725/142 |
| 2003/0035075 A1* | 2/2003 | Butler et al. ................ | 348/734 |
| 2003/0058810 A1* | 3/2003 | Petronic ..................... | 370/316 |

FOREIGN PATENT DOCUMENTS

| | | |
|---|---|---|
| JP | 09-18592 | 1/1997 |
| JP | 10-228229 | 8/1998 |
| JP | 10-271477 | 10/1998 |
| JP | 10-285460 | 10/1998 |
| JP | 11-306068 | 11/1999 |
| JP | 11-341471 | 12/1999 |

(Continued)

OTHER PUBLICATIONS

Japanese Office Action dated Mar. 8, 2005, with partial English translation.

(Continued)

*Primary Examiner*—Brian Nguyen
(74) *Attorney, Agent, or Firm*—McGinn IP Law Group, PLLC (57) ABSTRACT

In a communication system for carrying out satellite communication through a satellite among users, a satellite communication center is located in a terrestrial network, such as an internet, and has a program table accessible through the terrestrial network and representative of a time schedule of each program to be broadcast through the satellite. The program table can be reserved to broadcast contents by a sender through the internet when an empty time zone is left on the program table. When the reservation is accepted, the contents are sent from the sender through the internet to the satellite communication center and are broadcast at a reserved time through the satellite to other users in accordance with the program table. The contents may be stored in advance in an information storage of the satellite communication center once before they are broadcast or be directly broadcast to the satellite at the reserved time.

6 Claims, 4 Drawing Sheets

FOREIGN PATENT DOCUMENTS

| | | |
|---|---|---|
| JP | 2000-307575 | 11/2000 |
| JP | 2001-51926 | 2/2001 |
| JP | 2001-100625 | 4/2001 |
| JP | 2001-197478 | 7/2001 |
| JP | 2001-257975 | 9/2001 |
| JP | 2001-292436 | 10/2001 |
| JP | 2001-320684 | 11/2001 |

OTHER PUBLICATIONS

Koiki, Hideki, Development of AMF Satellite Communication System, NTT R&D, Electric Communication Association, Jun. 10, 1999, vol. 48, No. 6, pp. 506-512.

* cited by examiner

COMMUNICATION SYSTEM AND METHOD CAPABLE OF BROADCASTING BY USING TERRESTRIAL AND SATELLITE COMMUNICATION NETWORKS

BACKGROUND OF THE INVENTION

This invention relates to a multicast/broadcast communication system for use in carrying out multicast/broadcast communication through both terrestrial and satellite communication networks.

Lately, delivery services or businesses through an internet has become popular more and more and consequently grown up rapidly. For example, music and movies tend to be delivered through the internet in response to users' requests and conferences and seminars also have been held among remote locations through the internet. Even internet school has been considered which educates pupils or students who live in remote places. In these applications, a huge amount of communication contents should be continuously transmitted without any interruption for a predetermined duration. Such continuous transmission will be collectively called bit streaming. Such bit streaming has been expected of rapid growth in the future but encounters difficulties in view of signal performance and a communication capacity when it is realized only by the internet.

The above-enumerated broadcast, remote conferences, remote lessons through the internet may establish promising businesses. In addition, such businesses will do well through a current internet as long as users are restricted to a small number. However, when participants or users are increased in number, it is difficult to provide sufficient services to the users only by the internet. For example, it is assumed that a certain internet broadcast station provides live broadcast or live program at a rate of 300 kbps and that ten thousands (10,000) of users access the internet broadcast station. This requires a communication path with a net capacity of 3 Gbps. In general, several times of the capacity (3 Gbps) are required to keep a sufficient quality of communication by using a packet exchange method. As a result, a communication path of 10 Gbps or more is needed. This makes it difficult to practically realize such internet broadcast in view of both signal processing and costs imposed on the path.

In order to solve the above-mentioned problem, consideration may be made about using a broadcast method such that the internet broadcast station carries out transmission at a rate of 300 kbps only to a nearest router. Herein, it is to be noted in this method that a broadcast signal is delivered through the nearest router to all routers that are included in the internet.

In the meanwhile, the feature of the internet broadcast is that everybody can readily broadcast or transmit information through the internet. Taking this into account, it will be expected that internet broadcast stations explosively increase in number in the near future. For example, it is assumed that the internet broadcast stations increase in number to 1,000 in the internet. In this event, every one of the routers should cope with a communication traffic of 300 Mbps only for the internet broadcast. As mentioned before, a communication capacity of each router should have several times the communication traffic in order to maintain a sufficient quality of communication by using a packet exchange method. This shows that each communication path between adjacent routers should be 1 Gbps or more only for the internet broadcast. Accordingly, such a communication system can not be practically realized at the present.

Practically, a communication capacity or rate in the current internet is at most 50 kbps when a telephone line is used. Even when an ISDN is used, the communication capacity is as high as 64 kbps. In order to improve an access speed, various developments have been made about new technologies, such as ADSL (Asymmetric Digital Subscriber Line) and FTTH (Fiber To The Home). The former enables an access speed of about 1 Mbps while the latter enables an access speed of 100 Mbps.

Even when the access speed can be raised up, a recent problem is caused to occur in a speed of a broadband network. As well known in the art, the internet connects two points scattered in the world, through a lot of routers. With this structure, a long time is needed for communication or a packet is frequently discarded even when congestion takes place at a single router. This results in degradation of a quality of communication. In this situation, when senders or recipients in the internet broadcast are increased as mentioned before, overloads are imposed on the internet, which makes realization of such a network difficult.

SUMMARY OF THE INVENTION

It is an object of this invention to provide a communication system wherein a great number of subscribers can send information or contents without considering an increase of a communication capacity.

It is another object of this invention to provide a communication system of the type described, wherein satellite communication can be utilized by a lot of people at a low cost.

It is still another object of this invention to provide a communication system of the type described, wherein remote conferences and the like can be held among members widely spread.

It is yet another object of this invention to provide a communication system of the type described, wherein conventional receivers and the like can be used without any change.

Briefly, this invention resides in uniting or combining broadcast communication with terrestrial communication. Preferably, the broadcast communication is implemented by a satellite communication/broadcast system for executing satellite communication while terrestrial communication is implemented by an internet system. Herein, description will be made about features of the satellite communication. The satellite communication can establish a communication network that covers a very wide area (for example, one third) of the earth surface with a single geostationary satellite. The satellite communication is featured by having simultaneity in addition to wideness. This shows that the satellite communication is suitable, especially, for broadcasting and is currently commercially practiced in the form of Direct Satellite Broadcasting (DSB).

Herein, the DSB will be mentioned for a better understanding of this invention. It is to be noted that the DSB has several hundreds of channels for television broadcasting and radio broadcasting and has already had several millions of subscribers in Japan and more than 100 millions of subscribers in the world. However, only 200 channels have been used among available multiple channels in Japan and are too small in number as compared with the available channels. This means that a lot of unused channels are left in the available channels and may be used for internet broadcasting.

In the current DSB, contents, such as movies, news, are previously prepared or obtained by broadcasters and are unilaterally broadcast in accordance with a program schedule from the broadcasters to users, namely, subscribers. In this event, the subscribers can optionally select programs but can not send any information. This differs from the internet broadcasting in which everybody can send any information.

Now, the internet broadcasting will be described more in detail. Such internet broadcasting is disclosed in Japanese Unexamined Patent Publication No. 2001-100625 and is utilized to establish a system for providing remote lessons. The illustrated system has an internet broadcast system which uses a private leased network and a bulletin board system (BBS) which uses an internet system. With this system, students' questions are sent from the students through the internet system while answers are sent from professors or teachers to the students through the private leased network.

At any rate, the private leased network should be prepared in the system. This shows that the system described in the above-mentioned reference does not allow everybody to broadcast or send any information to unspecified number of people because the private leased network should be prepared.

Herein, it would be considered in the internet broadcasting that most of service providers that intend to deliver or broadcast their contents are small entities. Therefore, they usually do not have contents enough to broadcast all the times and may generally provide their contents stored in a home page to users. Practically, there have been fifty million home pages on the internet. However, such service providers might often require broadcast moving pictures or contents to be simultaneously broadcast, such as sports, solar eclipse, remote conferences, or the like. However, the above-mentioned internet broadcast system can not respond to such requirements.

Herein, it is noted in the internet that communication directed to only a specified number of qualified members is called multicast while communication directed to an unspecified number of people is called broadcast. Recent studies have been investigated about most effectively providing such multicast or broadcast by the use of the internet. However, it is practically difficult for a great number of routers of the internet to have such functions for the multicast or broadcast. Even if such routers would be developed, an internet communication network can not be practically realized in consideration of loads imposed on the network, by an increase of senders and/or recipients for the internet broadcasting.

Taking the above into consideration, this invention focuses on keeping a satellite communication path and leasing the satellite communication path to internet users by the hour by adopting a reservation system. To this end, a satellite communication center is provided which has a portal site on the internet so as to publish a program table representative of a time schedule of each program of broadcasting. Moreover, internet users can make a reservation on the program table to temporally reserve the satellite communication path. With this structure, viewers or users make sure of a program guide through the internet like in the conventional satellite communication and can watch a program in question at a broadcast time or record the program in a video tape recorder or the like by previously making a reservation. The recorded program can be watched later.

This invention is also featured by the fact that broadcasters or service providers can also make a reservation by the use of the program table to reserve their broadcast times through the satellite communication path. This feature of this invention is very effective when the broadcasters or service providers can not broadcast their contents all the times. Let remote conferences be held on a predetermined day and at a predetermined time for one hour by a group or entity that has a lot of members widely spread in various areas. It is assumed that the conference day and time are already arranged among the members and all the members attend the conference. In this case, when the conference day and time are previously reserved on the program table of the satellite communication center, the conference can be held at the reserved time among the members by effectively using the internet and the satellite communication. Likewise, it is possible to carry out distance education for pupils or students spread nationwide.

In addition, making a reservation on the program table can carry out broadcasting to an unspecified number of persons. In this event, running commentary can be carried out by starting at a reserved time through the satellite communication network or contents may be sent to the satellite communication center in advance to be stored in an information storage and may be broadcast at the reserved time.

The above-mentioned system gives not only viewers (recipients) but also service providers (senders) high freedom of communication of the internet along with wideness and simultaneity of the satellite communication. Thus, this invention provides a communication system which can independently carry out information exchange among a huge amount of people and which may be named an internet-aided satellite communication system.

Under the circumstances, the features of this invention will be summarized below.

According to a first aspect of this invention, a communication system is for use in carrying out multicast/broadcast communication through a terrestrial network and a digital broadcast network having a plurality of digital broadcast channels. The system comprises a communication center which has a program table accessible through the terrestrial network and representative of a time schedule of each program in the digital broadcast channels and a digital broadcast station, included in the digital broadcast network and coupled to the communication center, for broadcasting information through the digital broadcast network by assigning the digital broadcast channels in a time sharing manner in accordance with the program table.

According to a second aspect of this invention, the terrestrial network is an internet while the digital broadcast network is a satellite communication network including a satellite.

According to a third aspect of this invention, the communication center has the program table that is included in a home page and that is to be reserved in an empty time zone of the program table through the internet.

According to a fourth aspect of this invention, the satellite communication network includes a satellite earth station which is coupled to the communication center operated as a satellite communication center and which carries out two-way communication to the satellite through the digital broadcast channels.

According to a fifth aspect of this invention, the internet comprises, as subscribers, a plurality of service providers for delivering broadcast contents and a plurality of subscriber terminals for receiving the broadcast contents through the satellite of the satellite communication network.

According to a sixth aspect of this invention, the subscriber terminals include the ones that carry out two-way communication to the satellite and the other ones that are receive-only terminals for only receiving the broadcast contents from the satellite and that make access to the communication center through the internet.

According to a seventh aspect of this invention, the other subscriber terminals make access to the home page of the communication center to check the program table.

According to an eighth aspect of this invention, the terrestrial network is a public switched telephone network (PSTN) while the digital broadcast network is either one of a satellite communication broadcasting network and a terrestrial digital broadcasting network.

According to a ninth aspect of this invention, the terrestrial network is a mobile radio communication network while the digital broadcast network is either one of a satellite communication broadcasting network and a terrestrial digital broadcasting network.

According to a tenth aspect of this invention, the communication system is for use in carrying out communication by combining a terrestrial communication network with a satellite communication network which includes a satellite and an earth station. The communication system comprises service providing terminals, coupled to the terrestrial communication network, for delivering service contents to the terrestrial communication network and a satellite communication center, coupled to the earth station and the terrestrial communication network, for assigning a time zone to the service contents sent through the terrestrial communication network to deliver the service contents to the satellite through the earth station within the assigned time zone.

According to an eleventh aspect of this invention, the satellite communication center has a program table accessible through the terrestrial communication network to determine a time schedule of each program to be broadcast by the satellite. The satellite communication center comprises an interface circuit for sending the program table to the terrestrial communication network and a transmission circuit for transmitting the program table through the earth station to the satellite.

According to a twelfth aspect of this invention, the transmission circuit of the satellite communication center further transmits the service contents in accordance with the program table to the satellite through the earth station.

According to a thirteenth aspect of this invention, the satellite communication center comprises an information storage for storing the service contents sent through the terrestrial communication network. The transmission circuit is coupled to the information storage and transmitting the stored service contents with reference to the program table to produce the same within the assigned time zone.

According to a fourteenth aspect of this invention, the assigned time zone is previously reserved as a reserved time zone by the use of the program table sent to the terrestrial communication network. The service contents are received from the terrestrial communication network within the reserved time zone and being transmitted through the satellite communication center and the earth station through the satellite within the reserved time zone.

According to a fifteenth aspect of this invention, a method is for carrying out multicast/broadcast communication through a terrestrial network and a digital broadcast network having a plurality of digital broadcast channels. The method comprises the steps of providing, in a communication center, a program table which is accessible through the terrestrial network and which is representative of a time schedule of each program in the digital broadcast channels and broadcasting information from the communication center through the digital broadcast network by assigning the digital broadcast channels in a time sharing manner in accordance with the program table.

According to a sixteenth aspect of this invention, a method is for carrying out communication by combining a terrestrial communication network with a satellite communication network which includes a satellite and an earth station. The method comprises the steps of delivering service contents to the terrestrial communication network from service providing terminals which are coupled to the terrestrial communication network, providing a satellite communication center, coupled to the earth station and the terrestrial communication network, and assigning a time zone to the service contents sent through the terrestrial communication network in the satellite communication center to deliver the service contents to the satellite through the earth station within the assigned time zone.

According to a seventeenth aspect of this invention, the satellite communication center has a program table accessible through the terrestrial communication network to determine a time schedule of each program to be broadcast by the satellite. The method comprises the steps of sending the program table from the satellite communication center to the terrestrial communication network, and transmitting the program table through the earth station to the satellite.

DESCRIPTION OF THE PREFERRED EMBODIMENTS

Figure 1:
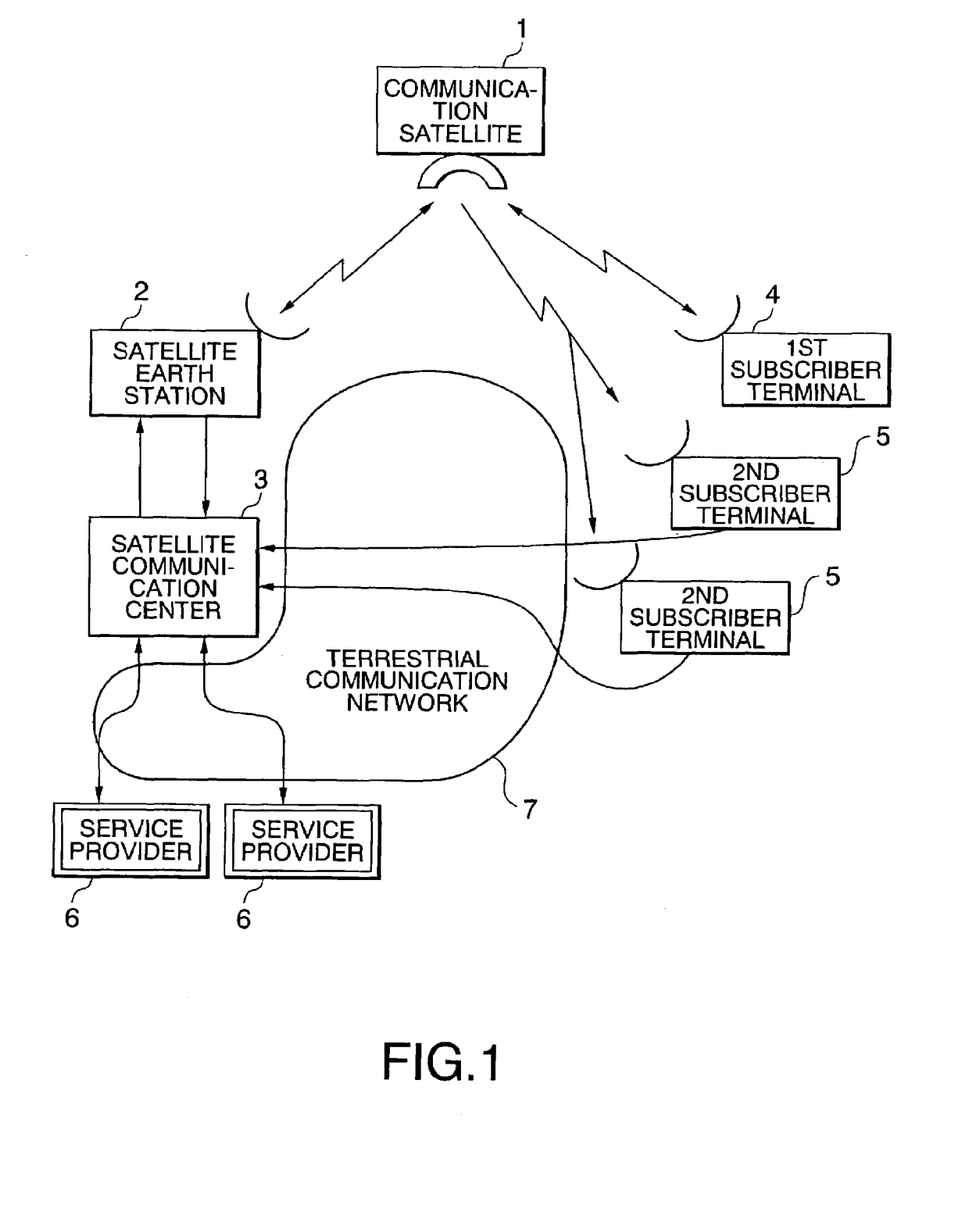
FIG. 1 is a block diagram of a broadcast system according to an embodiment of this invention.

Referring to FIG. 1, description will be made about a broadcast system according to an embodiment of this invention, wherein a lot of users can readily and inexpensively broadcast in a manner to be mentioned later in detail. The illustrated broadcast system includes a satellite communication system and an internet and is effective to hold conferences and/or seminars among a great number of remote places or remote users. Although the following description will be made only about the satellite communication system and the internet, this invention is not always restricted to them. For example, the satellite communication system and the internet may be replaced by a terrestrial digital broadcast system and a public switched telephone network (PSTN), respectively.

In FIG. 1, the broadcast system includes a communication satellite 1, a satellite earth station 2, a satellite communication center 3, first and second subscriber terminals 4 and 5, and service providers 6. The service providers 6 may be subscribers similar to the other subscriber terminals 4 and 6 but are represented by different reference numbers for distinguishing senders from recipients in FIG. 1.

It is assumed that the first subscriber terminal 4 can carry out two-way or bi-directional communication through the communication satellite 1 while each of the second subscriber terminals 5 is a receive-only subscriber terminal for only receiving a signal from the communication satellite 1. In this connection, the first subscriber terminal 4 has not only a function of receiving a signal from the communication satellite 1 but also a function of transmitting a signal to the communication satellite 1. On the other hand, the second subscriber terminal 5 has only a function of receiving a signal from the communication satellite 1 and may be inexpensive as compared with the first subscriber terminal 4. In general, the first subscriber terminal 4 is placed within an area having no terrestrial network while each of the second subscriber terminals 5 is placed at an area having any terrestrial network.

Furthermore, the illustrated system has a plurality of service providers 6 for providing information or contents. Each of the service providers 6 may be, for example, an internet broadcaster for broadcasting images and/or music, and for holding conferences, seminars, lectures, or an electronic book-publisher for delivering a great deal of data. As illustrated in FIG. 1, the service providers 6 and the second subscriber terminals 5 are communicable with each other through a terrestrial communication network 7, such as an internet system, a telephone network (a mobile radio communication network, a public switched telephone network (PSTN)), a facsimile network.

In the illustrated example, satellite communication is carried out between the satellite communication center 3 and the subscriber terminals 4 and 5 through the communication satellite 1. In addition, information exchange is also carried out between the satellite communication center 3 and the second subscribers 5 through the terrestrial communication network 7. The illustrated satellite communication center 3 has a home page set on the internet and can carry out the information exchange to each second subscriber terminal 5 when the home page is accessed by each second subscriber terminal 5. In other words, the satellite communication center 3 serves as one of portal sites of the internet when it is seen on the terrestrial communication network 7. Specifically, the satellite communication center 3 has a function of disclosing and updating a program table and a storage function of storing information sent from each service provider 6. The satellite communication center 3 is supplied from each service provider 6 with communication contents which are previously reserved and guaranteed. The communication contents reserved are kept by the use of the storage function in the satellite communication center 3 until a communication time reserved by each service provider.

Figure 2:
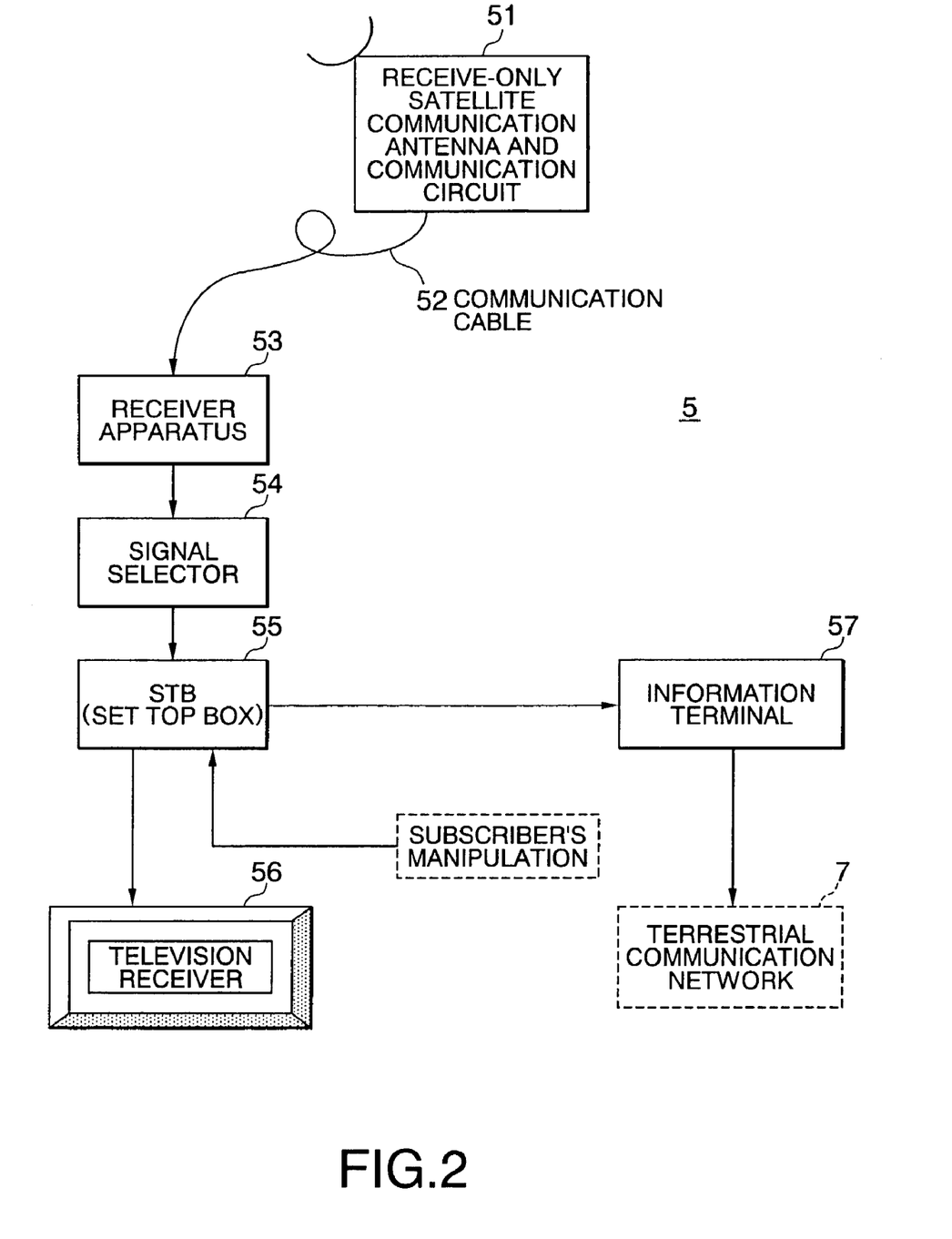
FIG. 2 shows a block diagram for use in describing a subscriber terminal which can be used in the broadcast system illustrated in FIG. 1.

Referring to FIG. 2, the subscriber terminal 5 has a receive-only satellite communication antenna and connection circuit 51, a connection cable 52, and a receiver apparatus 53 for amplifying and demodulating a received signal. In addition, the subscriber terminal 5 further has a signal selector 54 for selecting a signal destined to a subscriber in response to the received signal and a set-top-box (STB) 55 for storing the selected signal to reproduce image and voice in response to the subscriber's manipulation. The STB 55 is connected to an information terminal 57, such as a personal computer, communicable with the satellite communication center 3 through the terrestrial communication network 7, such as the internet.

The illustrated STB 55 is operable to set up a reception time of a broadcast signal, to make a reservation for reception, and to reproduce and store image, voice, and the like. A television receiver 56 displays the image, the voice, and the like in response to signals received through the STB 55 from the satellite 1.

The facilities illustrated in FIG. 2 can be practically implemented by using a DSB facility that is commercially widely sold at present. In this case, it is usual that the receive-only satellite communication antenna and connection circuit 51 is place out of doors while any other elements are placed indoors. The STB 55 and the television receiver 56 may be a receiving and displaying device for satellite broadcasting that is operable by each subscriber or a terminal of a school for satellite communication that is established in accordance with this invention.

Figure 3:
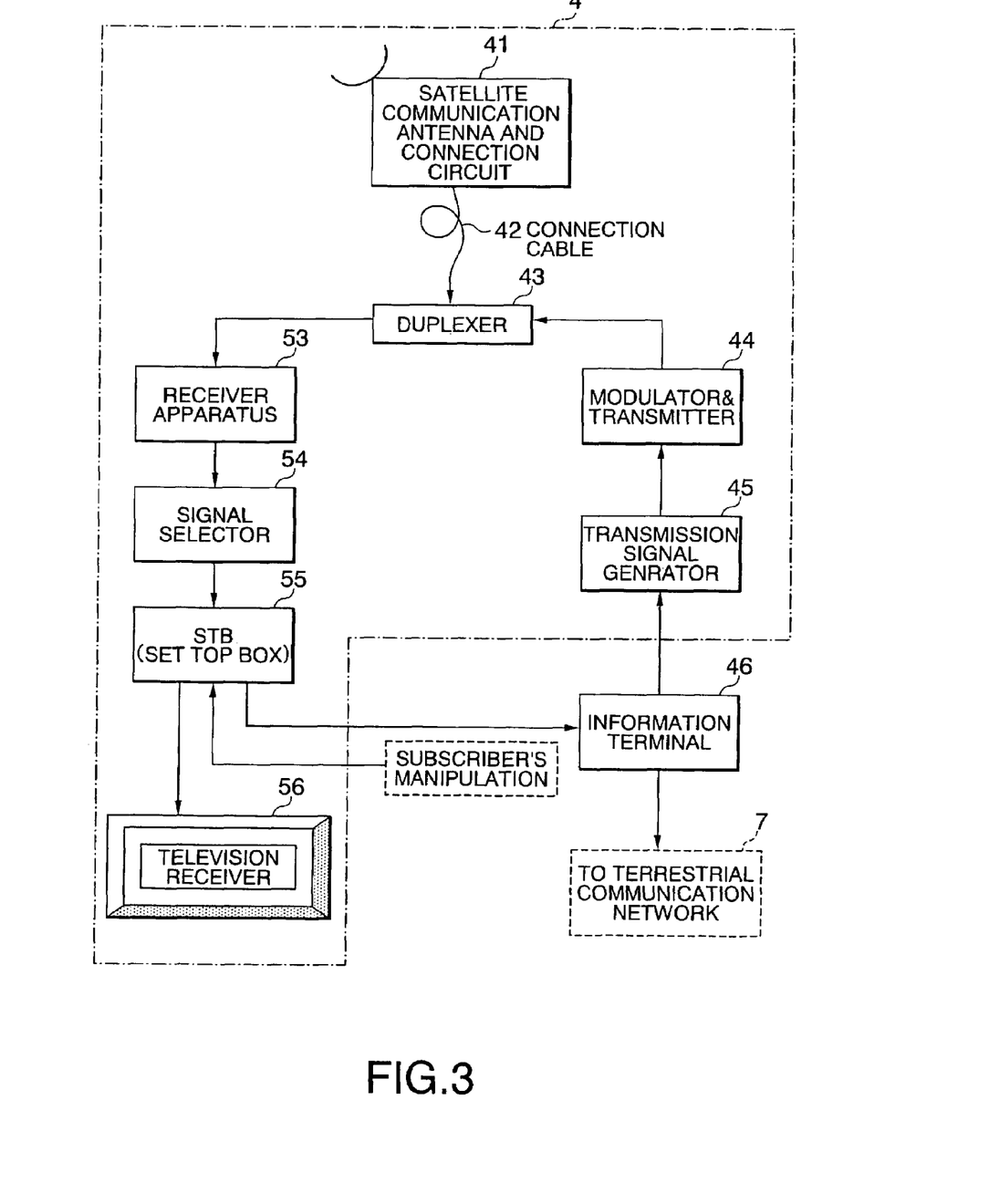
FIG. 3 shows a block diagram for use in describing another subscriber terminal which can be also used in the broadcast system illustrated in FIG. 1.

Referring to FIG. 3, the first subscriber terminal 4 has a two-way antenna and connection circuit 41, a connection cable 42, a duplexer 43 for separating a transmission signal and a reception signal, and an information terminal 46, such as a personal computer, or the like. In FIG. 3, the information terminal 46 is assumed to be connected to the terrestrial communication network 7 but may not be connected to the terrestrial communication network 7, as mentioned in conjunction with FIG. 1. In the illustrated example, information made up by the information terminal 46 is sent to a transmission signal generator 45 to be converted into a transmission signal which has a predetermined signal format. The transmission signal is supplied to the modulator and transmitter 44 to be modulated by a desired modulation method, frequency converted, and amplified and is thereafter transmitted from the satellite communication antenna and connection circuit 41 through the duplexer 43.

As mentioned before, the first subscriber terminal 4 includes a receiver portion and a transmitter portion. The receiver portion may be similar in structure to a DSB receiver apparatus while the transmitter portion may be similar in structure to a terminal device of a very small aperture terminal (VSAT) system.

Figure 4:
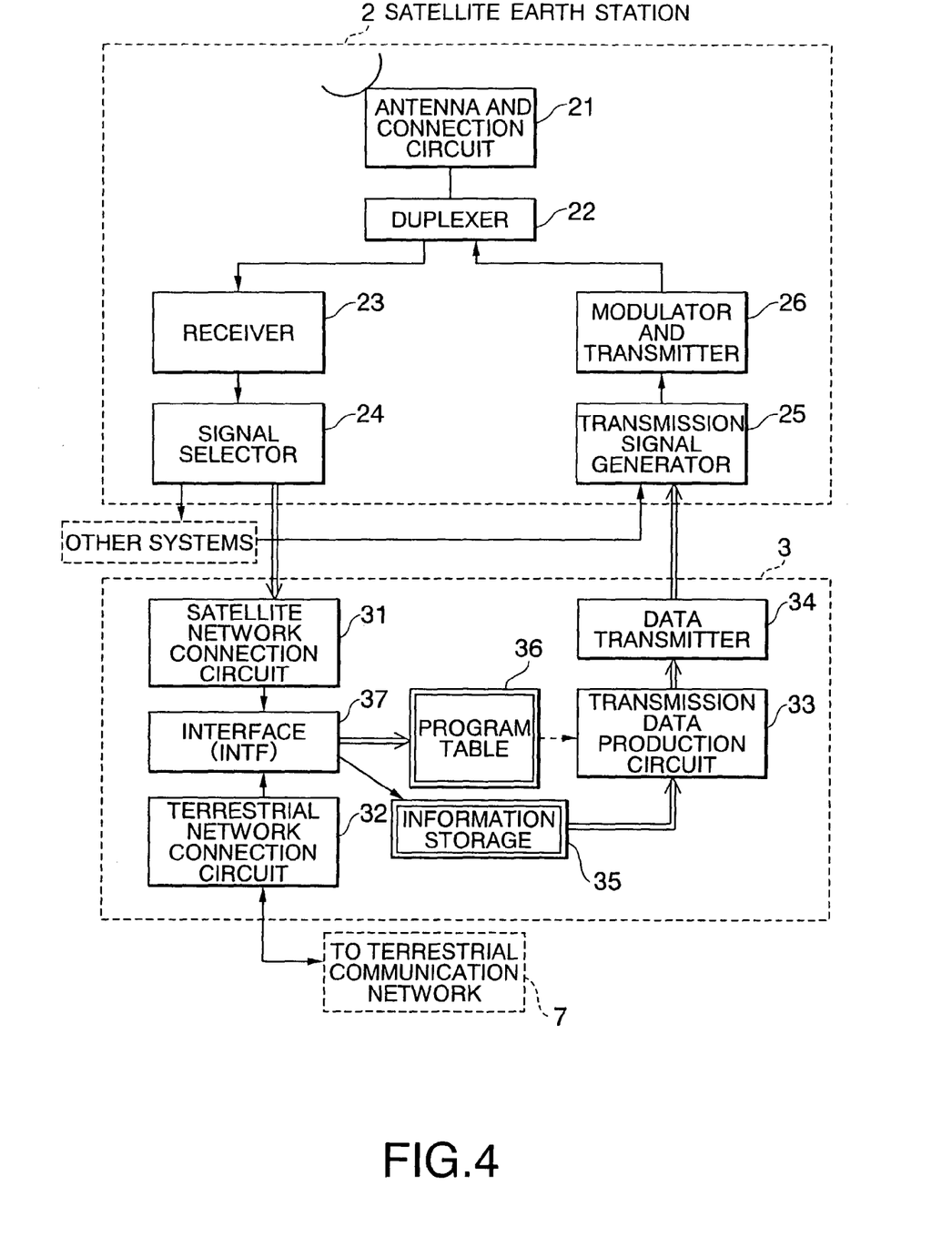
FIG. 4 shows a block diagram for use in describing an earth station and a satellite communication center both of which are used in the broadcast system illustrated in FIG. 1.

Referring to FIG. 4, illustrated are the satellite earth station 2 and the satellite communication center 3 both of which are shown in FIG. 1 and which serve as a core portion of this invention. The satellite earth station 2 has an antenna and connection circuit 21, a duplexer 22, a receiver 23, and a signal selector 24, a transmission signal generator 25, and a modulator and transmitter 26. The receiver 23 and the signal selector 24 form a receiver section of the earth station 2 while the transmission signal generator 25 and the modulator and transmitter 26 form a transmitter section of the earth station.

The satellite communication center 3 includes a satellite network connection circuit 31 and a terrestrial network connection circuit 32, both of which serve to receive signals from the satellite earth station 2 and the terrestrial communication network 7, respectively. In the satellite communication center 3, a transmission data production circuit 33 is included which is operable to produce transmission data to be transmitted or broadcast and to maintain the transmission data. The transmission data is read out of the transmission data production circuit 33 on the basis of a satellite system time and is supplied to a data transmitter 34 to be thereafter sent to the satellite earth station 2. An information storage 35 is included in the illustrated satellite communication center 3 to store a great deal of information. In this connection, the information storage 35 may be formed, for example, by a hard disk drive (HDD), a magnetic tape, a RAID (Redundant Arrays of Inexpensive Disks), or the like.

Furthermore, the satellite communication center 3 shown in FIG. 4 has a program table 36 and an interface (INTF) 37. In this case, the INTF 37 can make access to the program table 36 to read or update the program table 36. As a result, the program table 36 is read out or updated by users through the satellite network connection circuit 31 or the terrestrial network connection circuit 32. In this connection, the program table 36 is communicable with the subscribers 4 and 5 and the service providers 6 through the terrestrial communication network 7

Now, description will be directed to an operation of the communication system according to this invention. At first, each of the service providers 6 is assumed to prepare the portal sites on the internet and to store information to be delivered to each subscriber from each portal site. In general, each subscriber 4 and 5 can make access to the portal site to extract or down-load information from the portal site. Such a method may be called a pull type and provides a most popular internet system.

On the other hand, internet broadcast or internet conference may be called a push type and provides a new internet system. Therefore, such a pull type system is not harmonized with the internet in many points. For example, let the internet conference be held among a great number of members spread over a very wide area. In this event, a packet carrying information should be delivered only to routers corresponding to the members. To this end, all the routers used in the internet should have a function of detecting whether or not the destined members are present in routers' domains and a function of returning a rejection response when the destined members are absent. Such functions may be referred to as a multicast function and should be given to all the routers. However, it is practically difficult to provide the multicast function with all the routers.

Furthermore, the internet broadcast is directed to unspecified number of members and therefore needs to deliver signals to all the routers. In this case, each router should have a function of preventing the same signals from being endlessly repeated in a loop between the routers. Such a function may be called a broadcast function. It is practically difficult to realize the broadcast function on the internet system.

Even if the multicast and the broadcast functions could be realized on the internet, a quality of communication would be inevitably deteriorated due to an increase of a load imposed on a communication network, as recipients and senders become large in number. From this fact, it is readily understood that the internet system is not suitable for "bit streaming" communication or broadcast.

On the other hand, this invention has been invented in order to solve the above-mentioned problems following the internet system.

Herein, the broadcast system according to this invention is featured by the fact that a great deal of data (including communication and broadcast signals) can be effectively delivered to a huge number of users or members spread over a very wide area. To this end, a satellite is preferably used to broadcast or deliver the data over a very wide area through a wide band, as shown in FIG. 1.

Now, description will be made about operations of the broadcast system according to the first embodiment of this invention, with reference to FIG. 1 through FIG. 4. At first, let either one of the service providers 6 try to do broadcasting or to hold a conference by using the communication satellite 1 in a desired day and time. In this event, the service provider 6 in question makes access to the home page of the satellite communication center 3 through the terrestrial communication network 7, such as the internet, and reads the program table 36 from the home page.

The service provider 6 checks whether or not the program table 36 has an empty time zone at the desired day and time. If the empty time zone corresponding to the desired day and time is present in the program table 38, the service provider 6 makes a reservation on the program table 36. On making the reservation, the service provider 6 inputs various information, such as a provider's address or number, a planned duration, intended use, a manner of payment, and the like. In this event, inputting may be required about a distinction between the broadcasting and the conference, a title of a program, confidentiality or not, and so on. Herein, a utility fee or charge may be changed, depending upon a used time zone, a length of the used time, a used bandwidth, and etc.

When the reservation is accepted, the service provider pays fees to the satellite communication center 3 in consideration of contents of the reservation. In this case, electronic commerce may be utilized for paying the fees. Accepting the reservation is succeeded by updating or renewing the program table 36 and by broadcasting, for a short time, renewed contents, such as the distinction of the broadcasting and the conference, qualifications of participants to join, confidentiality or not, and etc. The renewed program table 36 is broadcast or televised through the communication satellite 1 to be received by the subscriber terminals 4 and 5 and is automatically written into them to be visually displayed on the display devices 56 of the subscriber terminals 4 and 5.

On the other hand, the renewed program table 36 may be displayed on the home page of the satellite communication center 3 and may be optionally read out by each subscriber through the terrestrial communication network 7, for example, the internet.

Distributing a key needed to decipher a confidential program falls outside of this invention and may be realized in a known technique. For example, such a deciphering key may be obtained by each subscriber by negotiating with each service provider 6 through the terrestrial communication network 7. However, obtaining such a key may be deputed by the satellite communication center 3 instead of each subscriber, if necessary.

In the illustrated example, the reservation can be changed before a predetermined time. For instance, a fee structure may be adopted such that a half of a reservation fee may be paid back to each service provider when the reservation is changed more than 24 hours before. In this case, only a quarter of the reservation fee is paid back 6 hours before while no fee is returned back from a time instant before one hour of the reserved time.

When a confidential conference is held behind closed doors, confidentiality and specifying participants should be checked on user's head by using the internet. If necessary, test broadcasting may be done through the communication satellite 1 for a short time so as to ascertain the function needed for the confidential conference.

Description will be made about the satellite communication carried out in the broadcast system illustrated in FIGS. 1 through 4.

It is assumed that one of the service providers 6 broadcasts, at a fixed time, contents previously prepared. The previous prepared contents are transmitted from the service provider 6 to the satellite communication center 3 through the terrestrial communication network 7 (in the example, the internet) before the fixed time to be stored in the information storage 35. In the satellite communication center 3, the transmission data production circuit 33 monitors the program table 36 and reads the stored contents out of the information storage 35 immediately before the fixed time. The contents read out of the information storage 35 are converted into a predetermined data format of, for example, MPEG or the like, and sent at the fixed time to the satellite earth station 2 through the data transmitter 34 to be broadcast from the communication satellite 1. This operation or function may be referred to as a satellite communication/ broadcast function of a storage type aided by the internet.

On the other hand, when simultaneity is required like in a conference, live broadcasting, each service provider 6 establishes a communication channel between the satellite communication center 3 and each service provider 6 through the terrestrial communication network (the internet in the illustrated example) 7. Broadcast contents are transmitted to the satellite communication center 3 from a reserved time point for a reserved duration. In the satellite communication center 3, the broadcast contents are received through the terrestrial network connection circuit 32 to the INTF 37 and are directly supplied to the transmission data production circuit 33 without being given to the information storage 35. Thereafter, they are supplied from the data transmitter 34 to the satellite communication station 2 and are broadcast through the communication satellite 1 in a manner similar to the above. This operation or function may be referred to as a satellite communication/broadcast function of a simultaneous type aided by the internet.

Preparation may be made for the case where any broadcast data stream can not be received by the satellite communication center 3 at the fixed time or the case where multicasting is executed such that no image can be seen by any other members than the participants. In this event, a parallel program may be broadcast for general users or audiences except the participants. Such a parallel program is previously listed or mentioned on the program table 36 and can be reserved by audiences or viewers. As a result, the parallel program can be watched by the audiences by using the subscriber terminals, such as 4 and 5 shown in FIG. 1. The parallel program may be formed by a program of a low rate that is composed of a still image, a voice, and the like and that may preferably carry effective information in consideration of viewers' opinions.

Taking the above into consideration, the broadcast system according to the first embodiment of this invention may be structured by the communication satellite 1, the satellite earth station 2 for carrying out broadcast and communication through the satellite 1, and the satellite communication center 3 connected to the satellite earth station 2 through the two-way communication channel.

The satellite communication center 3 is coupled to the subscriber terminals 4 and 5 through the terrestrial communication network 7, such as the internet. The satellite communication center 3 may have the portal site (home page (HP)) set up on the internet, the program table 36, and the information storage 35 for storing the broadcast contents. The satellite communication center 3 may further have a satellite communication/broadcast device, such as the transmission data production circuit 33, the data transmitter 34, and the like so as to carry out satellite communication/ broadcast by reading the information or contents out of the information storage 35 in accordance with the program table 36 and by sending the contents to the communication satellite 1.

With this structure, the program table 36 is disclosed or published in the portal site of the satellite communication center 3 and can be accessed to be read and reserved by the users or service providers. The satellite communication center 3 has the satellite communication/broadcast function of the stored type aided by the internet and the satellite communication/broadcast function of the simultaneous type aided by the internet. In the former function, the contents sent from each reserved service provider are previously received by the satellite communication center 3 to be stored in the information storage 35 and are broadcast in accordance with the program table 36 at the fixed time. In the latter, the communication channel is set up between the satellite communication center 3 and each reserved service provider 6 at the reserved time and is connected to the satellite 1 to form the satellite communication path and to carry out the live broadcasting/conference, or the like.

The Second Embodiment

While the above-mentioned description has thus far been made only about the broadcast system which uses the satellite communication, similar operation can be executed by the use of a broadcast station of a ground wave and a domestic communication/broadcast center similar in operation to the satellite communication center 3. In this case, the broadcast station of the ground wave may be substituted for both the communication satellite 1 and the satellite earth station 2 while each subscriber terminal 4 and 5 may have a receiver of a ground wave. With this system, it is possible to realize both a stored type communication/broadcast function and a simultaneous type communication/broadcast function.

Recently, digital terrestrial broadcast is expected to begin from 2003 in Japan in addition to the satellite communication while conventional analog broadcast will be abolished in 2011 in Japan.

Herein, the features of the digital terrestrial broadcast will be enumerated below.

1. Subscriber terminals are structured by radio equipment and a huge number of subscribers can be accommodated.

2. Each service area is very narrow as compared with that of the satellite communication. It is therefore possible to establish an information exchange system of a community-based type within a domestic area.

3. Wide area broadcast can also be accomplished by linking a plurality of zones.

4. A communication capacity can be extremely enlarged as a whole by reusing frequencies.

5. Receiving is possible even in a car or a train that is moving.

From this fact, it is readily understood that the digital terrestrial broadcast is excellent in comparison with the satellite communication in view of a very large communication capacity, possibility of mobile communication/broadcast, and simplicity of each receiver terminal. Accordingly, an internet radio broadcast system can be established by combining the digital terrestrial broadcast with the satellite communication and is very efficient. Extremely wide communication/broadcast can be also achieved by joining a plurality of domestic areas with a satellite or satellites.

Next, advantages of this invention will be described below.

The first one of the advantages is that a huge number of users, providers, or subscribers can execute internet broadcast inexpensively. In other words, the broadcast system according to this invention can provide broadcast at a low cost for an extremely large number of viewers spread over a whole of a very wide area (Japan or Asia), by using the satellite communication. The broadcast system according to this invention makes it possible to use a most of conventional direct satellite broadcast receivers which are widely sold in the world. Each of the subscriber terminals can be formed at a very low cost. Each service provider does not need to prepare a new satellite communication system and a new broadcast facility but can use a current satellite earth station facility coupled to the internet. Accordingly, inexpensive wide area broadcast and conference can be realized according to this invention.

The second advantage of this invention is to fully implement the internet broadcast. This is because every body can execute broadcast and can receive the broadcast by combining the internet with the satellite communication. In other words, the system according to this invention substantially has openness and freedom given by the internet, together with wideness and simultaneity of the satellite communication. This means that personal broadcast stations can be realized according to this invention. In this event, a plurality of personal broadcast stations can share the satellite and each execute nationwide broadcast for a short period of, for example, 15 minutes or so. This is very effective for each personal broadcast station because each personal broadcast station does not usually have a plenty of contents.

The third advantage of this invention is that the satellite communication is available by common people. Heretofore, the conventional satellite communication system is very large in scale and expensive and therefore can not be personally utilized. However, this invention makes it possible to personally utilize satellite communication easily and inexpensively like a conference room of each business office, by previously making a reservation in the program table. Thus, teleconferences, seminars, broadcasting on spots, and the like can be readily executed on a nationwide basis, with an enormous number of participants attended.

The fourth advantage is that the above-mentioned satellite communication system according to this invention can be combined with various terrestrial communication systems, without any change of the satellite communication system. This shows that conventional devices used in the existing systems can be also utilized in this invention, which is effective to reduce construction costs because the conventional devices can be manufactured at low costs due to volume efficiency of the devices. Moreover, a range of application is very broad because an information exchange network peculiar to each domestic zone can be constructed by using a terrestrial broadcast system and a mobile network can be also constructed.

The fifth advantage is to realize a highly-networked information society by naturally combining communication with broadcast. In other word, this invention can fully fulfill the internet broadcast in which an enormous number of participants can carry out both transmission and reception. As a result, this invention becomes greatly significant in society.

Herein, it is to be noted that conventional broadcast is one-way broadcast directed from a small number of senders to a huge number of receivers. Now, broadcast of Olympic games will be exemplified as an example of broadcast. A lot of games, such as swimming, track and field competition (athletics), gymnastics, judo, yachting, are simultaneously progressive. However, viewers can watch only a very small part of the games through a television channel of a broadcast station obtaining a broadcasting right and, consequently, can not watch a desired game, if it is unbroadcast through the television channel.

On the other hand, the broadcast system according to this invention can give a running commentary on all of the games. For example, a great number of games can be broadcast all over the world, by shooting a pictures on a spot by a digital camera, by making access to the satellite communication center through a mobile communication network, and by executing satellite communication.

When there have been only a small number of broadcast channels, broadcast has been monopolized by a minority and has been often utilized to govern a majority by the minority.

However, the broadcast system according to this invention makes it possible for every body to send and receive any information and can implement a free and open information exchange network. As a result, this system is helpful to clarify any social problems through broadcast, conferences, seminars, by having a dialogue and to thereby remarkably enhance the possibility of solving the problems. Thus, a true highly-networked information society can be realized when the public who have only received one-sided information get an information sending means.

The sixth advantage of this invention is to simultaneously fulfill antithetic requirements that have been imposed on conventional broadcast and communication, such as local and wide area coverage, broadcast reception and transmission, fixed and mobile communication. To this end, this invention unites terrestrial communication and satellite communication, along with internet and radio broadcast and effectively serves to construct the highly-networked information society. According to this invention, one-to-one, one-to-many, many-to-many communication, broadcast, and conference can be executed among a countless number of senders and receivers. This enables every body to utilize an electronic business and to easily participate with local or wide area events along with public administration, education, and culture activities.

What is claimed is:

1. A communication system for use in carrying out multicast/broadcast communication through a terrestrial network and a digital broadcast network having a plurality of digital broadcast channels, comprising:

a communication center which includes a program table accessible through the terrestrial network and representative of a time schedule of each program in the digital broadcast channels; and a digital broadcast station, included in the digital broadcast network and coupled to the communication center, for broadcasting information through the digital broadcast network by assigning the digital broadcast channels in a time sharing manner in accordance with the program table, wherein the terrestrial network comprises an Internet, wherein the digital broadcast network comprises a satellite communication network including a satellite, and wherein the communication center includes the program table that is included in a home page and that is to be reserved in an empty time zone of the program table through the Internet.

2. A communication system as claimed in claim 1, wherein the satellite communication network includes a satellite earth station which is coupled to the communication center operated as a satellite communication center and which carries out two-way communication to the satellite through the digital broadcast channels.

3. A communication system as claimed in claim 2, wherein the Internet comprises a plurality of service providers for delivering broadcast contents and a plurality of subscriber terminals for receiving the broadcast contents through the satellite of the satellite communication network.

4. A communication system as claimed in claim 3, wherein the subscriber terminals include subscriber terminals that carry out two-way communication to the satellite and other subscriber terminals that are receive-only terminals for only receiving the broadcast contents from the satellite and that make access to the communication center through the Internet.

5. A communication system as claimed in claim 4, wherein the other subscriber terminals make access to the home page of the communication center to check the program table.

6. A communication system for use in carrying out communication by combining a terrestrial communication network with a satellite communication network which includes a satellite and an earth station, comprising:
service providing terminals, coupled to the terrestrial communication network, for delivering service contents to the terrestrial communication network; and
a satellite communication center, coupled to the earth station and the terrestrial communication network, for assigning a time zone to the service contents sent through the terrestrial communication network to deliver the service contents to the satellite through the earth station within the assigned time zone,
wherein the satellite communication center includes a program table accessible through the terrestrial communication network to determine a time schedule of each program to be broadcast by the satellite and comprises:
an interface circuit for sending the program table to the terrestrial communication network; and
a transmission circuit for transmitting the program table through the earth station to the satellite, and
wherein the assigned time zone is previously reserved as a reserved time zone by the use of the program table sent to the terrestrial communication network;
the service contents being received from the terrestrial communication network within the reserved time zone and being transmitted through the satellite communication center and the earth station through the satellite within the reserved time zone.

* * * * *